Figure 1:
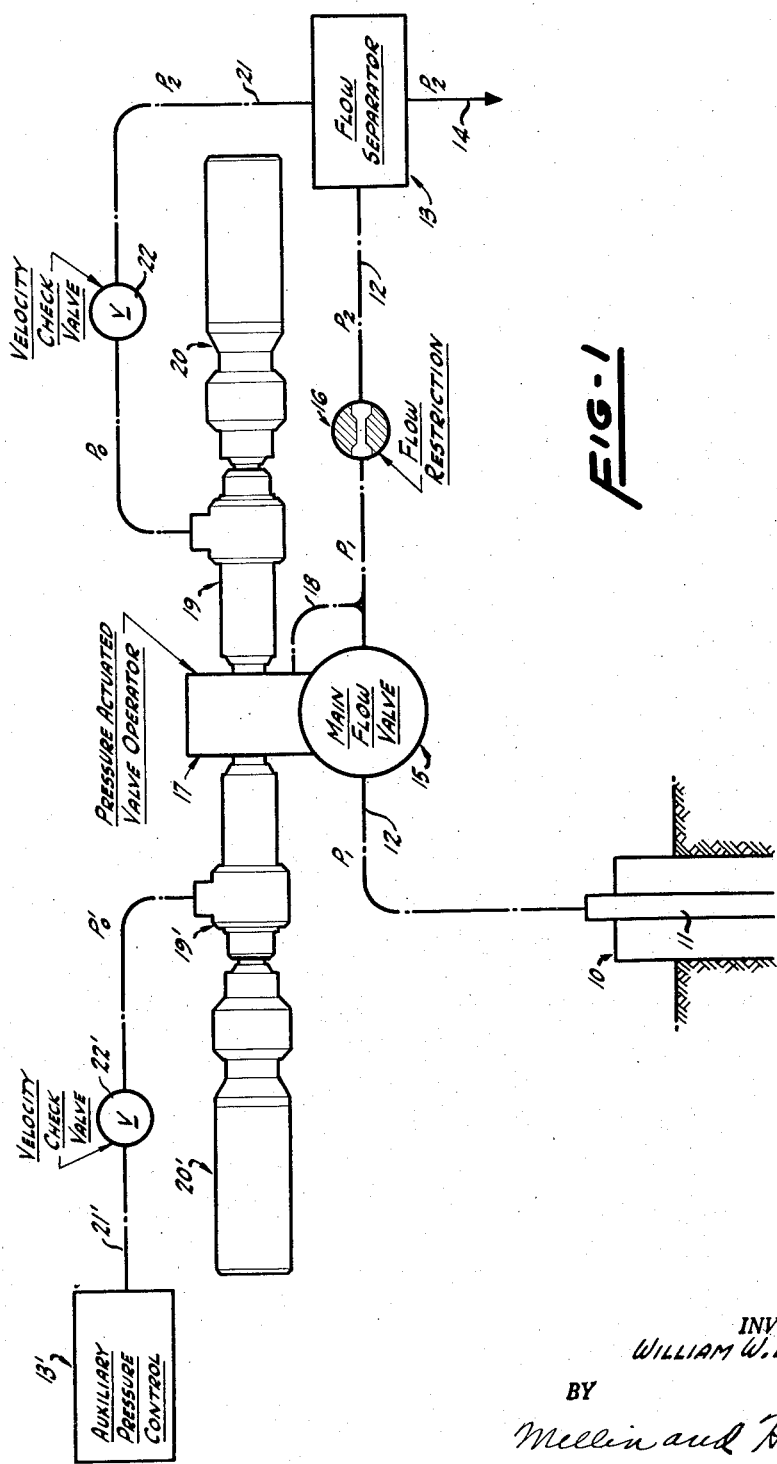

May 30, 1961 W. W. DOLLISON 2,986,157
PILOT VALVE
Filed April 28, 1959 2 Sheets-Sheet 1

INVENTOR.
WILLIAM W. DOLLISON
BY
    Mellin and Hanscom
        ATTORNEYS

May 30, 1961 W. W. DOLLISON 2,986,157
PILOT VALVE
Filed April 28, 1959 2 Sheets-Sheet 2
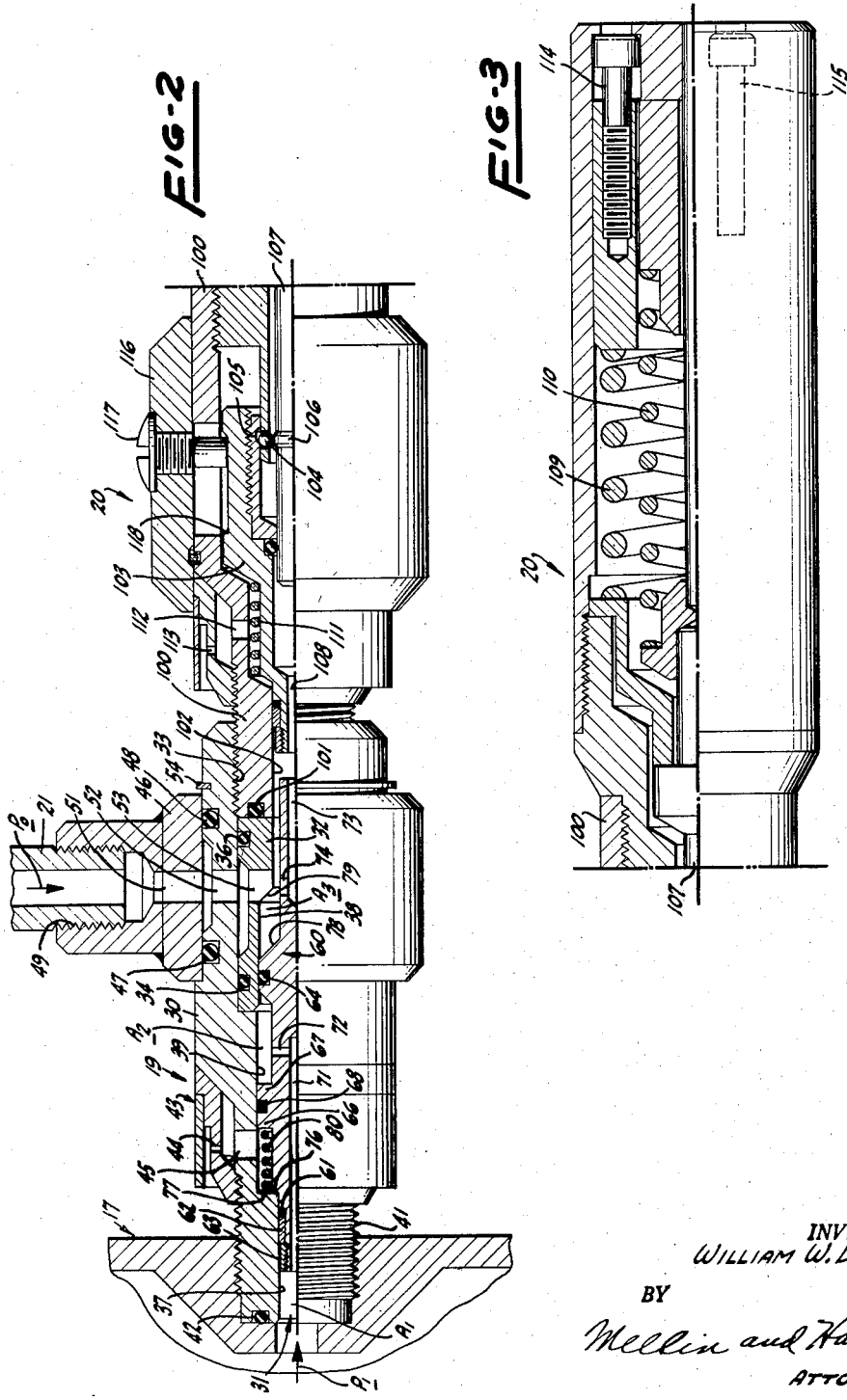
INVENTOR.
WILLIAM W. DOLLISON
BY
Mellin and Hanscom
ATTORNEYS United States Patent Office 2,986,157
Patented May 30, 1961

2,986,157
PILOT VALVE

William W. Dollison, Dallas, Tex., assignor to Otis Engineering Corporation, Dallas, Tex., a corporation of Texas Filed Apr. 28, 1959, Ser. No. 809,369
6 Claims. (Cl. 137—458)

This invention relates to pilot valves, and has for its primary object the provision of a pilot valve for use in controlling the pressure in one chamber in response to predetermined pressure conditions in another chamber.

Although the use is not so limited, the pilot valve of the present invention finds particular use in connection with pressure operated control valves. Such control valves are opened when the pressure within the operator is above a predetermined value and are closed when this pressure falls below this value. Pilot valves are then used to vent the operator to atmosphere in order to control the closing of the control valve. The present pilot valve can be used for this purpose, and is designed so that it in turn will be controlled by a remote pressure condition, which may or may not be related to the pressure of the fluid controlled by the control valve, as desired.

Another object of the invention is to provide a pilot valve in which the primary motive force for opening the valve comes from the pressure controlled by the valve.

Another object of the invention is to provide a pilot valve having a relatively large flow passage therethrough and having a valve member in the passage which is opened by the pressure under control and in which the pressure under control also exerts a closing force on the valve member in opposition to the opening force thereon.

A further object of the invention is to provide a pilot valve to control a pressure chamber in response to a pressure condition in another chamber and in which the last chamber may be remote from the first chamber, in which the last chamber may be dependent or independent from the first chamber as desired and in which the pressures in the two chambers will be fluidly separated from one another regardless of the position of the pilot valve.

Other objects and advantages will become apparent in the course of the following detailed description.

In the drawings, forming a part of this application, and in which like parts are designated by like reference numerals throughout the same, Fig. 1 is a schematic illustration of a fluid flow system utilizing a plurality of pilot valves constructed in accordance with the present invention to control flow through a well head conduit.

Figs. 2 and 3 are continued sectional views of the pilot valve of Fig. 1 constructed in accordance with the invention, with the valve parts shown in closed position.

Referring now to Fig. 1, a cased-in well 10, having a tubing string 11 therein, is connected by flow line 12 to a separator 13 or similar device. Flow line 14 leads from the separator to any desired point. The flow line 12 has made up therein a main flow control valve 15 and an orifice or other restriction 16.

The control valve 15 is controlled by a pressure actuated valve operator 17 which operates in such manner that whenever the fluid pressure in operator 17 is above a predetermined value, the control valve 15 will be open for flow through line 12. Whenever the fluid pressure in operator 17 is below the predetermined value, control valve 15 will close to shut off the flow through line 12. The pressure operated valve operator 17 may be pressurized from conduit 18 which connects to the main flow line 12. Since such control valves and operators therefor are in common and extensive use, it is not thought necessary to illustrate these elements in detail. An example of a suitable valve and operator for such use is that shown in U.S. Letters Patent No. 2,566,772 to H. C. Otis.

The pressure actuated valve operator 17 is adapted to be vented to atmosphere upon the occurrence of a predetermined pressure condition or conditions by one or more pilot valves 19 and 19' which in turn are each controlled by pilot valves 20 and 20'. The details of these pilot valves will be discussed hereinafter in connection with Figs. 2 and 3.

A conduit 21 is connected between the flow separator 13 and pilot valve 19 and has a velocity check valve 22 made up therein. Similarly, a conduit 21', having a velocity check valve 22' made up therein, is connected between pilot valve 19' and a desired device 13' having an auxiliary control fluid pressure therein.

For purposes of later discussion, the fluid pressure in flow line 12 upstream of restriction 16 and in the valve operator 17 is represented by $P_1$, and the fluid pressure in flow lines 12 and 14 downstream of restriction 16 is represented by $P_2$, $P_1$ being greater than $P_2$. The fluid pressures in conduit 21 upstream and downstream of the velocity check valve 22 are represented by $P_2$ and $P_0$ respectively, $P_0$ being less than or equal to $P_2$. The fluid pressure in conduit 21' at pilot valve 19' is represented by $P_0'$.

Turning now to Fig. 2, pilot valve 19 comprises a valve body 30, having a bore 31 therethrough. A sleeve member 32 is inserted into the threaded end 33 of bore 31 and is sealed thereto by O-rings 34 and 36. Thus the bore 31 through the valve body is comprised of two restricted diameter portions 37 and 38 (the latter being the bore of sleeve 32) separated by an enlarged diameter bore mid-portion 39. The valve body is threaded at 41 for engagement with the pressure actuated valve operator 17, to which the valve body is sealed by O-ring 42.

A tubular muffler element 43 is threaded onto the valve body and is provided with openings 44 therethrough which comunicate with the openings 45 through the valve body into the enlarged diameter bore mid-portion 39 adjacent the restricted diameter bore portion 37. The openings 44 and 45 serve to vent the bore mid-portion to atmosphere.

A coupling member 46 is rotatably mounted on the body 30 and is sealed thereto by O-rings 47 and 48. The coupling member is threaded at 49 for the reception of conduit 21, and openings 51, 52 and 53 are provided through the coupling member 46, body 30 and sleeve 32, respectively, to place conduit 21 and bore 38 in fluid communication. The coupling member is held against longitudinal movement relative to the valve body 30 by snap ring 54.

A valve plunger 60 is coaxially disposed in bore 31 for longitudinal sliding movement therein. The left end of the plunger carries thereon an O-ring seal 61, held in place by O-ring retainer 62 and nut 63. When the plunger 60 is in the position shown in Fig. 2, the bore portion 37 is sealed against fluid flow past O-ring 61 and thus bore 31 cannot vent to atmosphere through vent openings 44 and 45.

The plunger 60 is sealed at its right end to the restricted diameter bore portion 38 by O-ring 64 carried by the plunger.

The plunger 60 is provided with annular flanges 66 and 67 carrying an annular seal ring 68 therebetween to seal against the enlarged diameter bore mid-portion 39 on the right side (as seen in Fig. 2) of the vent opening 45.

Axial bore 71 and opening 72 form a passageway through the plunger to place the restricted diameter bore portion 37 in fluid communication with the bore 38 between the plunger-carried O-rings 64 and 68. The right end of plunger 60 has an axial bore 73 therein and a side port 74. The fluid pressure inside and outside the plunger at its right end is equal.

Movement of the plunger 60 to the left in valve body 30 is stopped by the engagement of plunger shoulder 76 with bore shoulder 77, and movement of the plunger to the right is limited by the engagement of the complementary sloping surfaces 78 and 79 on the plunger 60 and sleeve 32 respectively. Spring 80, confined between plunger flange 66 and bore shoulder 77, continually urges the plunger 60 to the right in the valve body bore.

Valve body 100 of pilot valve 20 screws into pilot valve 19 at the threaded end 33 of the latter and is sealed against sleeve 32 by O-ring 101 carried by valve body 100.

Pilot valve 20 is essentially identical in construction and operation to that disclosed in my copending application for "Balanced Pilot Valve," Serial No. 696,708, filed November 15, 1957, and now issued as U.S. Letters Patent No. 2,902,046.

Since this pilot valve is fully illustrated and described in the above patent it is thought to be sufficient for the purposes of the present invention to merely describe the operation of this valve.

As shown in Figs. 2 and 3, the bore 102 of pilot valve 20 is closed by valve member 103, which is locked against movement to the right by locking balls 104, which in turn are held within valve member groove 105 by a flange 106 on plunger 107. Valve member 103 has a passage 108 therein to allow fluid pressure $P_0$ in conduit 21 to force against plunger 107, urging this plunger to the right.

Rightward movement of the plunger is resisted by the high pressure spring 109 and low pressure spring 110. If the pressure $P_0$ becomes sufficiently great, the plunger 107 will be moved to the right against the bias of these springs, allowing the locking balls 104 to move inwardly out of valve member groove 105. The pressure $P_0$ and spring 111 will then move the valve member 103 to the right, allowing the bore 102 to vent to atmosphere through the valve body opening 112 and muffler port 113.

Similarly, if the pressure $P_0$ acting on the plunger decreases sufficiently, the low pressure spring 110 will move the plunger to the left, again unlocking the valve member for movement to open position.

Thus, the valve member will be unlocked for opening if the pressure $P_0$ in bore 102 rises above or falls below the range determined by the bias of the high and low pressure springs 109 and 110. The spring force of these springs, and consequently the pressure range of this pilot valve may be adjusted by adjustment screws 114 and 115.

The valve member may be reset to closed position by moving reset sleeve 116 to the left, causing stud 117 to engage valve member shoulder 118 and to move the valve member back to the position illustrated in Figs. 2 and 3.

When pilot valve 20 is coupled to pilot valve 19 as shown, the fluid pressure $P_0$ exerted through conduit 21 will be present in both the restricted diameter bore portion 38 of pilot valve 19 and in the bore 102 of pilot valve 20. As a consequence, pilot valve 20 will act to exhaust the restricted diameter bore portion 38 of valve 19 to atmosphere whenever the value of $P_0$ varies from the pressure range for which pilot valve 20 is set.

*Operation*

In operation, the pilot valve 20 is connected to pilot valve 19, pilot valve 19 is connected to the pressure actuated vale operator 17, and control conduit 21 is connected to pilot valve 19, as shown in Figs. 1, 2 and 3. With these connections, pressure $P_1$ is present in the bore portion 37 of pilot valve 19 and in the bore 39 between O-rings 64 and 68 of this valve. Pressure $P_0$ is present in bore portion 38 of valve 19 and also acts on the plunger 107 of pilot valve 20.

In the following discussion, $A_1$ is the cross-sectional area of the bore portion 37, $A_2$ is the annular cross-sectional area determined by the cross-sectional area of bore portion 39 minus the cross-sectional area of bore portion 38, $A_3$ is the cross-sectional area of the bore portion 38 of pilot valve 19, and the force of spring 80 is represented by F. $A_1$, $A_2$ and $A_3$ are in square inches, F is in pounds, and $P_1$ and $P_0$ are in pounds per square inch.

The plunger 60 of pilot valve 19 is urged to the right by forces $P_1A_1$ and F, and is urged to the left by forces $P_1A_2$ and $P_0A_3$. The plunger will be in the position shown in Fig. 2 whenever the following inequality exists:

$$P_0A_3 > P_1(A_1 - A_2) + F$$

and the pilot valve 19 will be sealed against venting to atmosphere.

In the event that pilot valve 20 is set to exhaust to atmosphere at a relatively low value of $P_0$ such that $$P_0A_3 < P_1(A_1 - A_2) + F$$

then the plunger 60 will move to the right in pilot valve 19 until the plunger 60 abuts valve member 103 of pilot valve 20. However, if $P_0$ is still within the range for which pilot valve 20 will remain closed, as determined by the adjustment of spring 110, valve member 103 will remain locked in its closed position. The force exerted on valve member 103 by plunger 60 will be equal to $$P_1(A_1 - A_2) + F - P_0A_3$$

Pilot valve 19 will still be closed against venting because the movement of plunger 60 to the right is so limited by valve member 103 that the plunger O-ring 61 remains within and seals the bore portion 37.

If it were not for the balancing force to the left on plunger 60, i.e. $P_1A_2$, the force on the valve member 103 might be sufficiently great to cause the locking balls 104 to be wedged inwardly against plunger flange 106 in such manner as to greatly impair the sensitivity of pilot valve 20. However, the balancing force $P_1A_2$ does prevent such binding, and allows pilot valve 20 to operate to venting position as soon as $P_0$ drops below the predetermined range for which the valve has been set.

When $P_0$ drops below the predetermined range, the valve member 103 is unlocked for movement to the right and pilot valve 20 vents to atmosphere, thereby placing the bore portion 38 of pilot valve 19 to the right of O-ring 64 at atmospheric pressure. That is, $P_0$ now drops to atmospheric pressure, eliminating $P_0A_3$ as a force to the left on plunger 60.

In order that pilot valve 19 may now open to atmosphere it is necessary that the forces acting on plunger 60 be such that $$P_1A_1 + F > P_1A_2$$

This condition will always be fulfilled, regardless of the values of $P_1$ or F, if $A_1 > A_2$. That is, if $A_1 > A_2$, then the plunger will always be moved to the right by the pressure, $P_1$, to vent bore portion 37 whenever $P_0$ drops to atmosphere.

$A_2$ can be greater than $A_1$, however, if a proper spring 80 is used with regard to the expected value of $P_1$, such that $$\frac{F}{P_1} > A_2 - A_1$$

If this last inequality is met, then plunger 60 will be moved to the right to unseal bore portion 37 whenever pilot valve 20 vents to atmosphere.

The same conditions will be present if $P_0$ rises above the range for which pilot valve 20 is set. That is, when the value of $P_0$ so rises, pilot valve 20 will operate to vent $P_0$ to atmosphere and pilot valve 19 will then vent the valve actuator 17 to atmosphere.

In the foregoing description, $P_0$ has been dependent upon the pressure $P_1$ in main flow line 12, and the main valve actuator 17 has thus been responsive to main line pressure. However, another pilot valve combination, indicated by 19' and 20' may also be used to vent the valve actuator 17 in response to variations in $P_0'$ in an independent pressure source, if desired. The operation will be identical to that described above. That is, as long as the pressure $P_0'$ remains in the range for which pilot valve 20' has been set, pilot valve 19' will remain closed, although the plunger thereof may move back and forth in valve 19', or into and out of engagement with the valve member of pilot valve 20'. When the pressure $P_0'$ rises or falls outside of the range for which pilot valve 20' has been set, pilot valve 20' will vent to atmosphere to allow pilot valve 19' to vent to atmosphere.

As may be seen, the pilot valve 19 may be actuated in response to variations in control pressures, which pressures may be dependent on or independent from the pressure $P_1$. Furthermore, a single device, such as the valve operator 17 may be controlled by a plurality of pilot valves 19 each of which may be responsive to separate reference pressure conditions. The pilot valve 19 fluidly separates the pressures $P_1$ and $P_0$, so that if a battery of pilot valves 19 are used, the venting of the valve operator 17, in response to one pressure condition, will not vent or otherwise affect the pressure sources controlling the other pilot valves.

As may be seen from the foregoing, the primary motive force for opening the pilot valve 19 comes from the pressure $P_1$ being controlled by the pilot valve. That is, when plunger 60 is free to move to the right to open position, the plunger will so move primarily because of the pressure $P_1$, although some opening force will be exerted by spring 80. The pressure $P_1$ in no way binds the plunger 60, regardless of how high $P_1$ is.

Even though the diameter of the bore 31 is relatively large, so as to permit the valve operator 17 to vent rapidly when bore 31 is open, the opening force $P_1A_1$ exerted by $P_1$ on the plunger is opposed by the closing force $P_1A_2$ and consequently the total opening force on the plunger 60 is relatively small. Thus, $P_0$ can be relatively small in comparison to $P_1$ and may yet hold the plunger 60 out of contact with the valve member 103 of pilot valve 20. Even though the plunger 60 may move into contact with the valve member 103, the force exerted thereon will not adversely affect the operation of pilot valve 20 because of the opposing force $P_1A_2$ exerted on the plunger.

It is to be realized that the form of the invention herewith shown and described, is to be taken as a preferred embodiment of the same, and that various changes may be made in the shape, size and arrangement of parts without departing from the spirit of the invention or the scope of the attached claims.

Having thus described my invention, what I claim and desire to secure by Letters Patent is:

1. A remote controlled pilot valve comprising a valve body having a bore therein, said bore having restricted diameter portions separated by an enlarged diameter mid-portion, a plunger member disposed in said bore for longitudinal sliding movement therein between a first position wherein one end of said plunger is sealingly disposed in one of said restricted diameter bore portions to a second position wherein said one plunger end is disposed in said enlarged diameter mid-portion of said bore to allow fluid communication between said one restricted diameter bore portion and the enlarged diameter bore mid-portion adjacent thereto, the other end of said plunger being sealingly disposed in the other of said restricted diameter bore portions, an annular flange on said plunger disposed in sliding engagement wtih said enlarged diameter mid-portion of said bore, a vent passage through said valve body from the exterior thereof into said bore mid-portion adjacent said one restricted diameter bore portion, passage means through said plunger fluidly communicating said one restricted diameter bore portion to said bore between said plunger flanges and said other plunger end, means for connecting said one restricted diameter bore portion to a source of pressure fluid to be controlled, means for connecting said other restricted diameter bore portion to a source of control pressure fluid, means forming a passage for venting said other restricted diameter bore portion to atmosphere, a valve member disposed in said last passage for movement coaxially relative to said plunger between a first position wherein said last passage is closed and a second position wherein said last passage is open, means responsive to a predetermined pressure of said control pressure fluid for moving said valve member from its first to its second position, and interengageable means on said plunger and said valve member for restraining movement of said plunger to its second position when said valve member is in its first position and for permitting movement of said plunger to its second position when said valve member is in its second position.

2. A remote controlled pilot valve comprising a valve body having a bore therein, said bore having restricted diameter portions separated by an enlarged diameter mid-portion, a plunger member disposed in said bore for longitudinal sliding movement therein between a first position wherein one end of said plunger is sealingly disposed in one of said restricted diameter bore portions to a second position wherein said one plunger end is disposed in said enlarged diameter mid-portion of said bore to allow fluid communication between said one restricted diameter bore portion and the enlarged diameter bore mid-portion adjacent thereto, the other end of said plunger being sealingly disposed in the other of said restricted diameter bore portions when said plunger is in both first and second positions thereof, an annular flange on said plunger disposed in sealed and sliding engagement with said enlarged diameter mid-portion of said bore when said plunger is in both first and second positions thereof, a vent passage through said valve body from the exterior thereof into said bore mid-portion adjacent said one restricted diameter bore portion, passage means fluidly communicating said one restricted diameter bore portion to said bore between said plunger flanges and said other plunger end, means for connecting said one restricted diameter bore portion to a source of pressure fluid to be controlled, means for connecting said other restricted diameter bore portion to a source of control pressure fluid, means forming a passage for venting said other restricted diameter bore portion to atmosphere, a valve member disposed in said last passage for movement coaxially relative to said plunger between a first position wherein said last passage is closed and a second position wherein said last passage is open, means engageable with said valve member to restrain movement of said valve member from its first to its second position, means responsive to a predetermined fluid pressure condition within said other restricted diameter bore portion for removing said motion restraining means from engagement with said valve member to allow movement of said valve member from its first to its second position, and interengageable means on said plunger and said valve member for restraining movement of said plunger to its second position when said valve member is in its first position and for permitting movement of said plunger to its second position when said valve member is in its second position.

3. A remote controlled pilot valve comprising a valve body having a bore therein, said bore having restricted diameter portions separated by an enlarged diameter mid-portion, a plunger member disposed in said bore for longitudinal sliding movement therein between a first position wherein one end of said plunger is sealingly disposed in one of said restricted diameter bore portions to a second position wherein said one plunger end is disposed in said enlarged diameter mid-portion of said bore to allow fluid communication between said one restricted diameter bore portion and the enlarged diameter bore mid-portion adjacent thereto, the other end of said plunger being sealingly disposed in the other of said restricted diameter bore portions when said plunger is in both first and second positions thereof, an annular flange on said plunger disposed in sealed and sliding engagement with said enlarged diameter mid-portion of said bore when said plunger is in both first and second positions thereof, a vent passage through said valve body from the exterior thereof into said bore mid-portion adjacent said one restricted diameter bore portion, passage means fluidly communicating said one restricted diameter bore portion to said bore between said plunger flange and said other plunger end, means for connecting said one restricted diameter bore portion to a source of pressure fluid to be controlled, means for connecting said other restricted diameter bore portion to a source of control pressure fluid, means forming a passage for venting said other restricted diameter bore portion to atmosphere, a valve member disposed in said last passage for movement coaxially relative to said plunger between a first position wherein said last passage is closed and a second position wherein said last passage is open, means engageable with said valve member to restrain movement of said valve member from its first to its second position, means responsive to a predetermined pressure of said control pressure fluid for removing said motion restraining means from engagement with said valve member to allow movement of said valve member from its first to its second position, and interengageable means on said plunger and said valve member for restraining movement of said plunger to its second position when said valve member is in its first position and for permitting movement of said plunger to its second position when said valve member is in its second position.

4. A remote controlled pilot valve comprising a valve body having a bore therein, said bore having restricted diameter portions separated by an enlarged diameter mid-portion, a plunger member disposed in said bore for longitudinal sliding movement therein between a first position wherein one end of said plunger is disposed in one of said restricted diameter bore portions to a second position wherein said one plunger end is disposed in said enlarged diameter mid-portion of said bore to allow fluid communication between said one restricted diameter bore portion and the enlarged diameter bore mid-portion adjacent thereto, the other end of said plunger being disposed in the other of said restricted diameter bore portions when said plunger is in both first and second positions thereof, an annular flange on said plunger disposed in sliding engagement with said enlarged diameter mid-portion of said bore when said plunger is in both first and second positions thereof, first seal means for sealing said one plunger end to said one restricted diameter bore portion when said one plunger end is disposed therein, second seal means for sealing said plunger flange to said bore mid-portion, third seal means for sealing said other plunger end to said other restricted diameter bore portion, a vent passage through said valve body from the exterior thereof into said bore mid-portion adjacent said one restricted diameter bore portion, passage means through said plunger fluidly communicating said one restricted diameter bore portion to said bore between said second and third seal means, means for connecting said one restricted diameter bore portion to a source of pressure fluid to be controlled, means for connecting said other restricted diameter bore portion to a source of control pressure fluid, means forming a passage for venting said other restricted diameter bore portion to atmosphere, a valve member disposed in said last passage for movement between a first position wherein said last passage is closed and a second position wherein said last passage is open, means engageable with said valve member to restrain movement of said valve member from its first to its second position, and means responsive to a predetermined fluid pressure condition within said other restricted diameter bore portion for removing said motion restraining means from engagement with said valve member to allow movement of said valve member from its first to its second position.

5. A remote controlled pilot valve comprising a valve body having a bore therein, said bore having restricted diameter portions separated by an enlarged diameter mid-portion, a plunger member coaxially disposed in said bore for longitudinal sliding movement therein between a first position wherein one end of said plunger is disposed in one of said restricted diameter bore portions to a second position wherein said one plunger end is disposed in said enlarged diameter mid-portion of said bore to allow fluid communication between said one restricted diameter bore portion and the enlarged diameter bore mid-portion adjacent thereto, the other end of said plunger being disposed in the other of said restricted diameter bore portions when said plunger is in both first and second positions thereof, an annular flange on said plunger disposed in sliding engagement with said enlarged diameter mid-portion of said bore when said plunger is in both first and second positions thereof, first seal means for sealing said one plunger end to said one restricted diameter bore portion when said one plunger end is disposed therein, second seal means for sealing said plunger flange to said bore mid-portion, third seal means for sealing said other plunger end to said other restricted diameter bore portion, a vent passage through said valve body from the exterior thereof into said bore mid-portion adjacent said one restricted diameter bore portion, passage means through said plunger fluidly communicating said one restricted diameter bore portion to said bore between said second and third seal means, spring means in said valve body biasing said plunger member from its first to its second position in said bore, means for connecting said one restricted diameter bore portion to a source of pressure fluid to be controlled, means for connecting said other restricted diameter bore portion to a source of control pressure fluid, means forming a passage for venting said other restricted diameter bore portion to atmosphere, a valve member disposed in said last passage for movement coaxially relative to said plunger between a first position wherein said last passage is closed and a second position wherein said last passage is open, means responsive to a predetermined fluid pressure condition within said other restricted diameter bore portion for moving said valve member from its first to its second position, and interengageable means on said plunger and said valve member for restraining movement of said plunger to its second position when said valve member is in its first position and for permitting movement of said plunger to its second position when said valve member is in its second position.

6. In a device as set forth in claim 5 wherein $A_1$ represents the cross-sectional area of said one restricted diameter bore portion, wherein $A_2$ represents the difference in cross-sectional areas of said enlarged diameter bore mid-portion and said other restricted diameter bore portion, wherein said spring means exerts a force F and wherein said fluid pressure to be controlled has a value $P_1$, said spring force, pressure and areas being interrelated such that $$\frac{F}{P_1} > A_2 - A_1$$

References Cited in the file of this patent

UNITED STATES PATENTS

| | | |
|---|---|---|
| 476,511 | Birkery | June 7, 1892 |
| 647,706 | Robertshaw | Apr. 17, 1900 |
| 2,350,202 | Thomas | May 30, 1944 |